(12) United States Patent
Shiwaku

(10) Patent No.: US 6,183,184 B1
(45) Date of Patent: *Feb. 6, 2001

(54) WORK TRANSPORT SYSTEM

(75) Inventor: Tamotsu Shiwaku, Kani (JP)

(73) Assignee: Murata Machinery, Ltd., Kyoto (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/890,302

(22) Filed: Jul. 9, 1997

(30) Foreign Application Priority Data

Sep. 30, 1996 (JP) .................................... 8-278633
Mar. 13, 1997 (JP) .................................... 9-082140

(51) Int. Cl.⁷ .................................... B65G 1/04

(52) U.S. Cl. .................... 414/281; 414/626; 212/327

(58) Field of Search .................. 414/626, 627, 414/331.01, 282, 277, 281; 254/4 R, 4 C, 264; 212/312, 327

(56) References Cited

U.S. PATENT DOCUMENTS

| | | | | |
|---|---|---|---|---|
| 840,807 | * | 1/1907 | Shem | 414/673 |
| 3,593,869 | * | 7/1971 | Zurheide et al. | 414/626 |
| 4,049,132 | * | 9/1977 | Strömbäck | 414/626 X |
| 4,474,523 | * | 10/1984 | Murao | 414/331 |
| 4,735,539 | * | 4/1988 | Häkkinen et al. | 414/281 |
| 4,787,804 | * | 11/1988 | Edenäs | 414/281 |

FOREIGN PATENT DOCUMENTS

3342849 * 6/1985 (DE) .................................... 414/626

* cited by examiner

Primary Examiner—Frank E. Werner
(74) Attorney, Agent, or Firm—Finnegan, Henderson, Farabow, Garrett, & Dunner, L.L.P.

(57) ABSTRACT

A work transport system having an overhead travelling carriage that runs along a rail arranged near the ceiling, arranged with a storage rack member upon which work may be loaded, between the floor and the rail. As the storage rack member upon which work may be loaded is arranged between the floor and the rail, the space of the processing station and floor may be decreased and the transfer time of the work by the overhead travelling carriage may be reduced.

7 Claims, 15 Drawing Sheets

FIG. 7
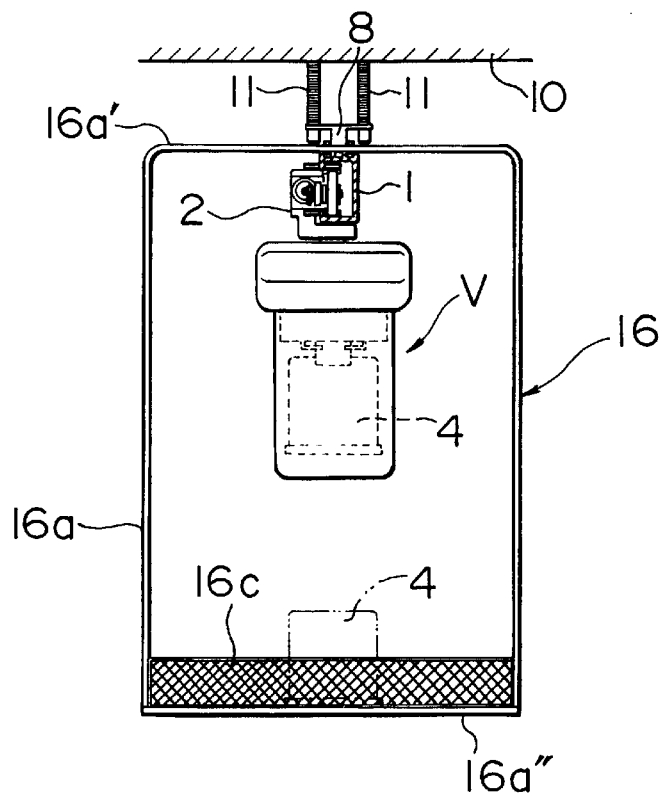
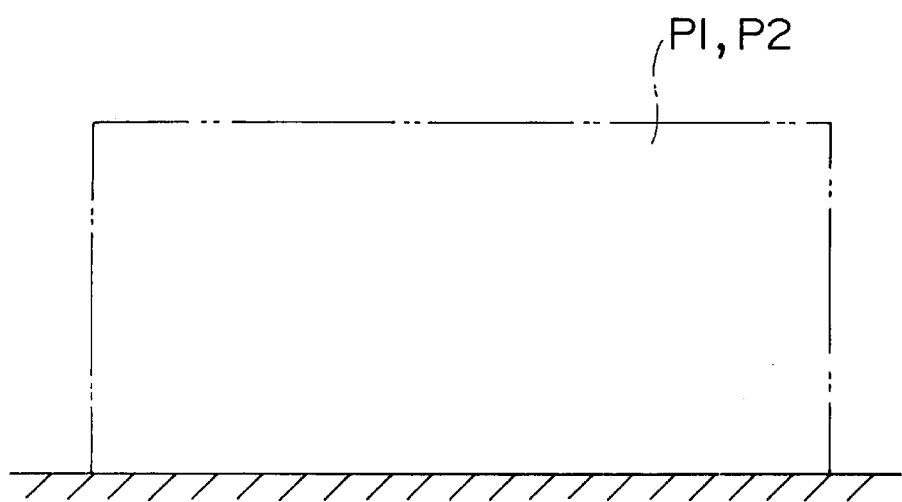

FIG. 8
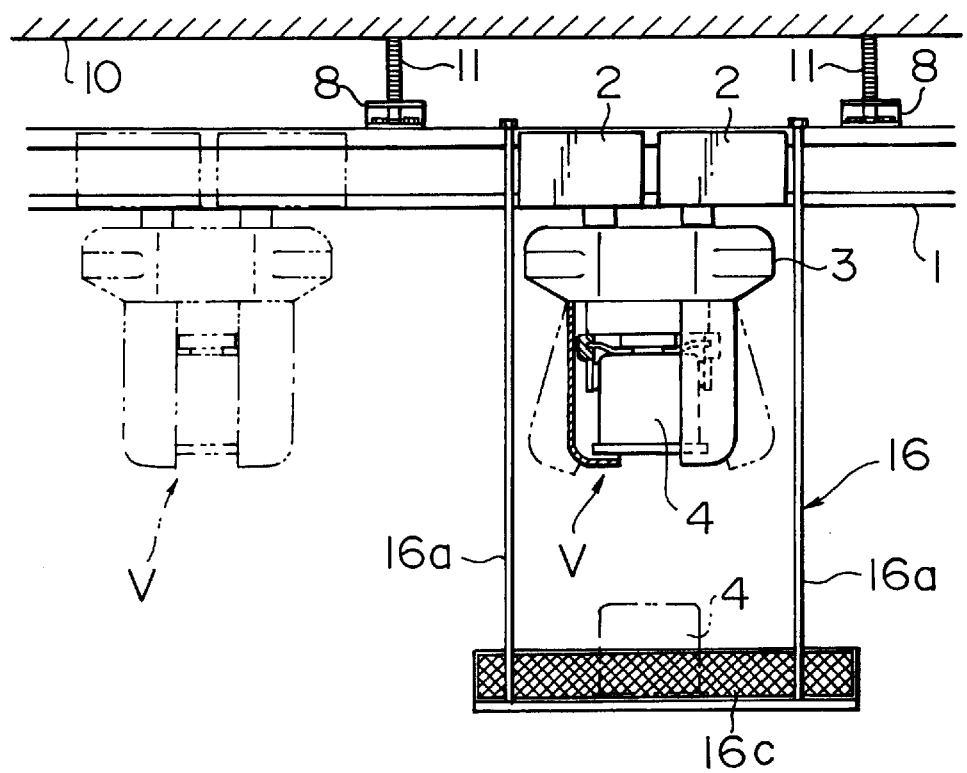
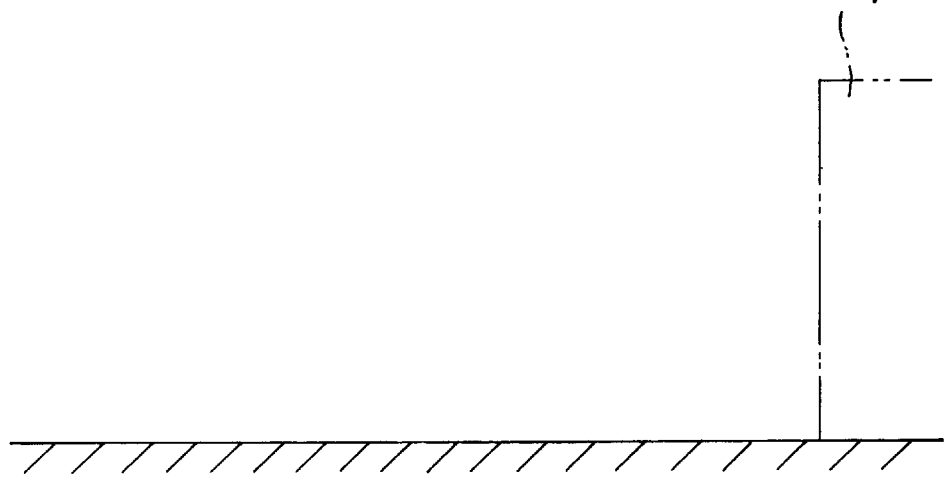

WORK TRANSPORT SYSTEM

FIELD OF THE INVENTION

The present invention relates to work transport system for not only transporting boxes (hereafter, a box in which finished products and unfinished products are stored will be known simply as "work") in which each type of intermediate product and finished product is stored, using a travelling carriage that runs along a rail arranged in the vicinity of the ceiling, but also stacks work at processing stations that perform the various processing of the work and retrieves work from the processing station by vertically moving the work.

BACKGROUND OF THE INVENTION

Conventionally, a work transport system has been known where, after stopping above a predetermined processing station, a winding drum arranged on the overhead travelling carriage is suitably rotated in both directions and by winding the wire onto the winding drum or feeding out the wire from the winding drum, a chuck device that grips the work moves vertically and stacks work gripped in the chuck device at the processing station or retrieves work from the processing station by gripping the work in the chuck device.

On conventional work transport systems, when batch processing is performed by grouping a plurality of works at a predetermined processing station, a predetermined quantity of work is stacked at the processing station or on the floor near the processing station or a table placed on the floor or the like using the overhead travelling carriage, and thereafter, a predetermined quantity of work is supplied to the processing station using the overhead travelling carriage once again. As conventional work transport systems stack work at the processing station or on the floor near the processing station or on a table placed on the floor or the like in this way, the processing station and floor area must be enlarged.

Furthermore, as the work is stacked at the processing station or on the floor near the processing station or a table placed on the floor or the like, the distance for vertical movement of the chuck device that grips the work increases and as a result, the stacking time of the work increases and the operating efficiency of the overhead travelling carriage decreases.

SUMMARY OF THE INVENTION

It is an object of the present invention to propose a work transport system that solves those problems present on a conventional system.

In order to achieve the aforementioned object, a first aspect of the present invention being a work transport system having an overhead travelling carriage that runs along a rail arranged near the ceiling and vertically moves a chuck device by winding a wire onto a winding drum or feeding out the wire from the winding drum by forward and backward rotation of the winding drum, is the positioning of a storage rack member on which work may be stacked above the floor and morever, below the rail.

A second aspect of the present invention is the mounting of a platform assembly on the rail.

A third aspect of the present invention is the presence of a groove formed along the longitudinal direction of the rail into which a nut may be inserted and a framework arranged with a hole into which a bolt may be inserted, the insertion of the bolt in the hole of the framework arranged on the rail, moreover the mounting of the framework on the rail by the screwing of the bolt into the nut inserted in the groove formed in the rail, and the mounting of the rack on that framework.

A fourth aspect of the present invention is the arrangement of a work storage conveyor between the rail and floor and the arrangement of a predetemined position above the conveyor as a work transfer station and the transfer of work between this station conveyor and the overhead travelling carriage.

A fifth aspect of the present invention is the arrangement of a pair of stations on the conveyor where work received at one station is moved to the other station by the conveyor and transported by the overhead travelling carriage from the other station.

A sixth aspect of the present invention is the arrangement of a work processing device along the rail by the arrangement of the work transport system inside a clean room, the opposed positioning of the conveyors at the work processing device and moreover, the suspension of that from the rail.

BRIEF DESCRIPTION OF THE DRAWING

FIG. 7 is a complete side view of the storage rack member and overhead travelling carriage for describing the the mounting means of the storage rack member on the rail on the work transport system of the present invention.

FIG. 8 is a complete front view of the storage rack member and overhead travelling carriage for describing the the mounting means of the storage rack member on the rail on the work transport system of the present invention.

DETAILED DESCRIPTION OF THE PREFERRED EMBODIMENTS

Figure 1:
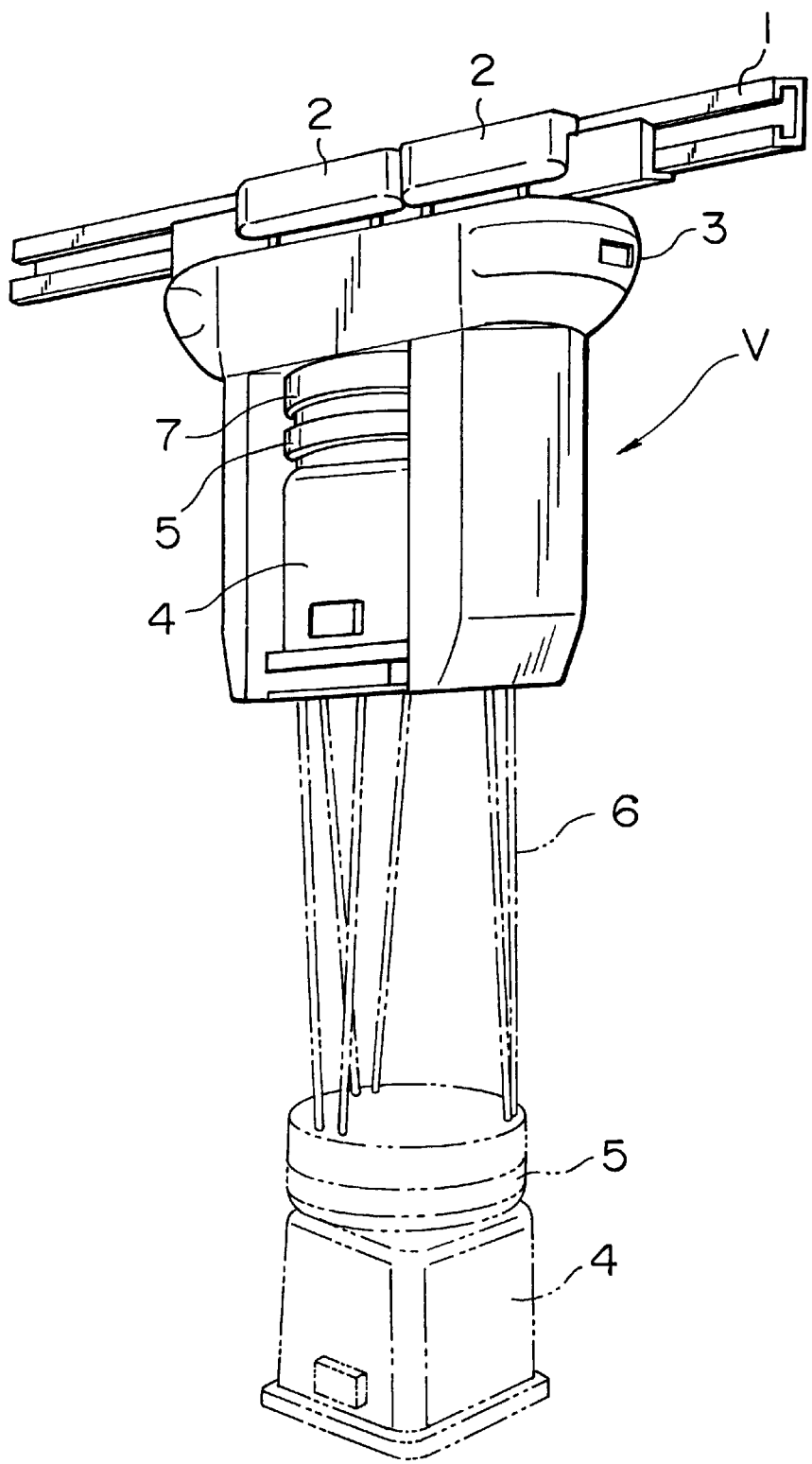
FIG. 1 is a perspective view of the overhead travelling carriage or the like that is used on the work transport system of the present invention.

Firstly, an overhead travelling carriage V that runs along a rail arranged near the ceiling that comprises the work transport system of the present invention will be described using FIG. 1.

1 is a rail arranged near the ceiling by a mounting means to be described later, and the vertical cross sectional shape of the rail 1 in the longitudinal direction is formed as a C shape. 2 are two carriages and a travelling carriage main body 3 is linked by a pivot shaft (to be described later to) the carriages 2. A hoist unit 7 having a winding drum that is able to vertically move a chuck device 5 by winding or feeding out a wire 6 on which is mounted the chuck device 5 that is able to grip a work 4, is arranged on the lower part of the travelling carriage main body 3.

Figure 2:
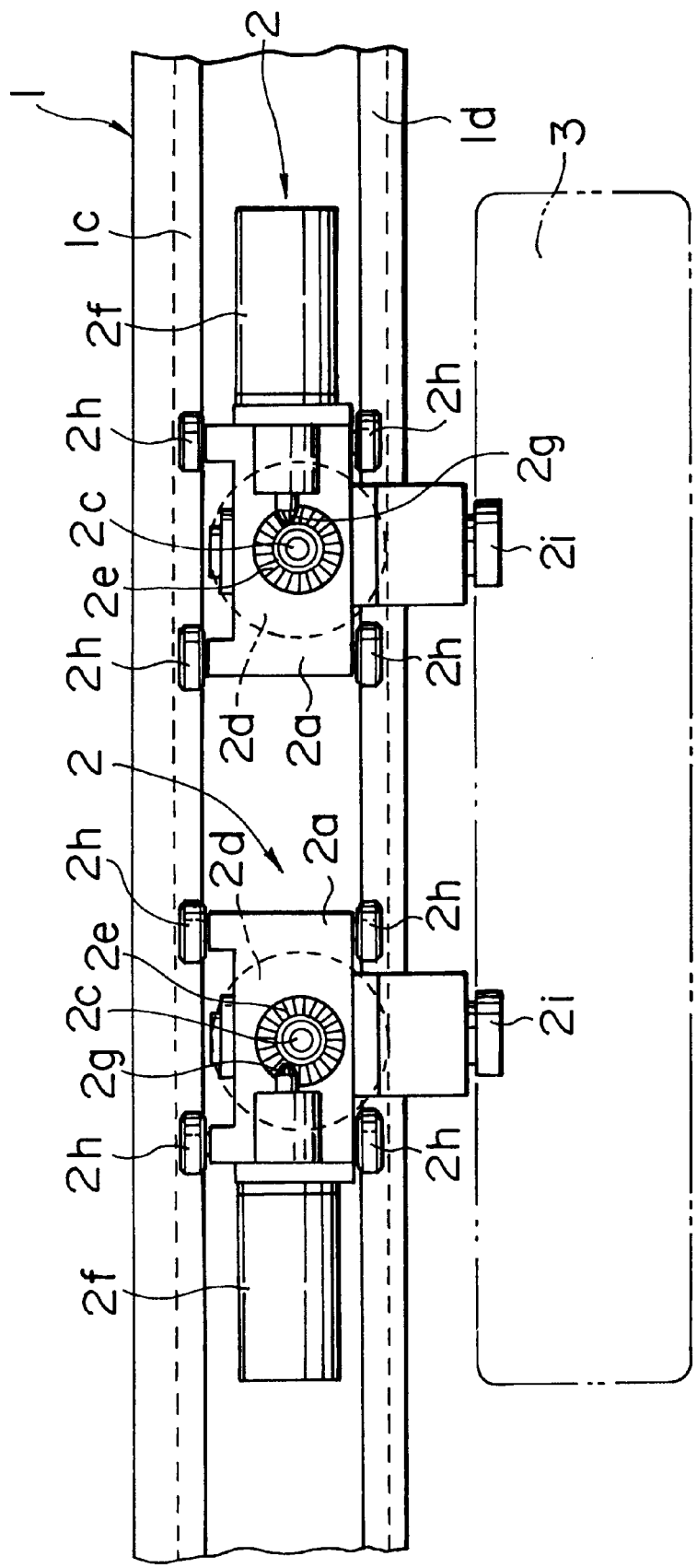
FIG. 2 is a summarised front view of the overhead travelling carriage or the like that is used on the work transport system of the present invention.
Figure 3:
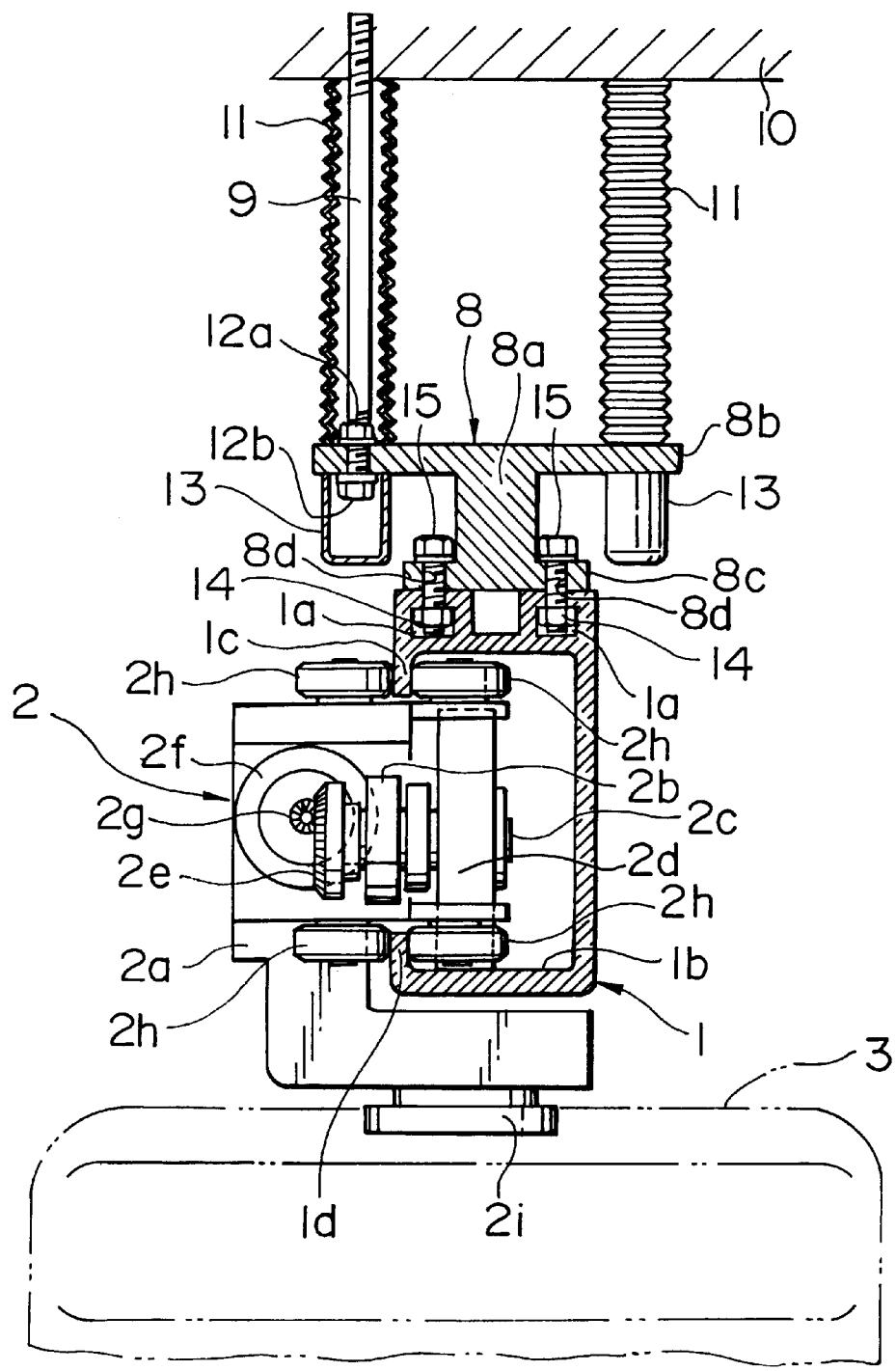
FIG. 3 is a summarised side view including a partial vertical section of the rail and overhead travelling carriage or the like for describing the mounting means of the rail on the work transport system of the present invention.
Figure 4:
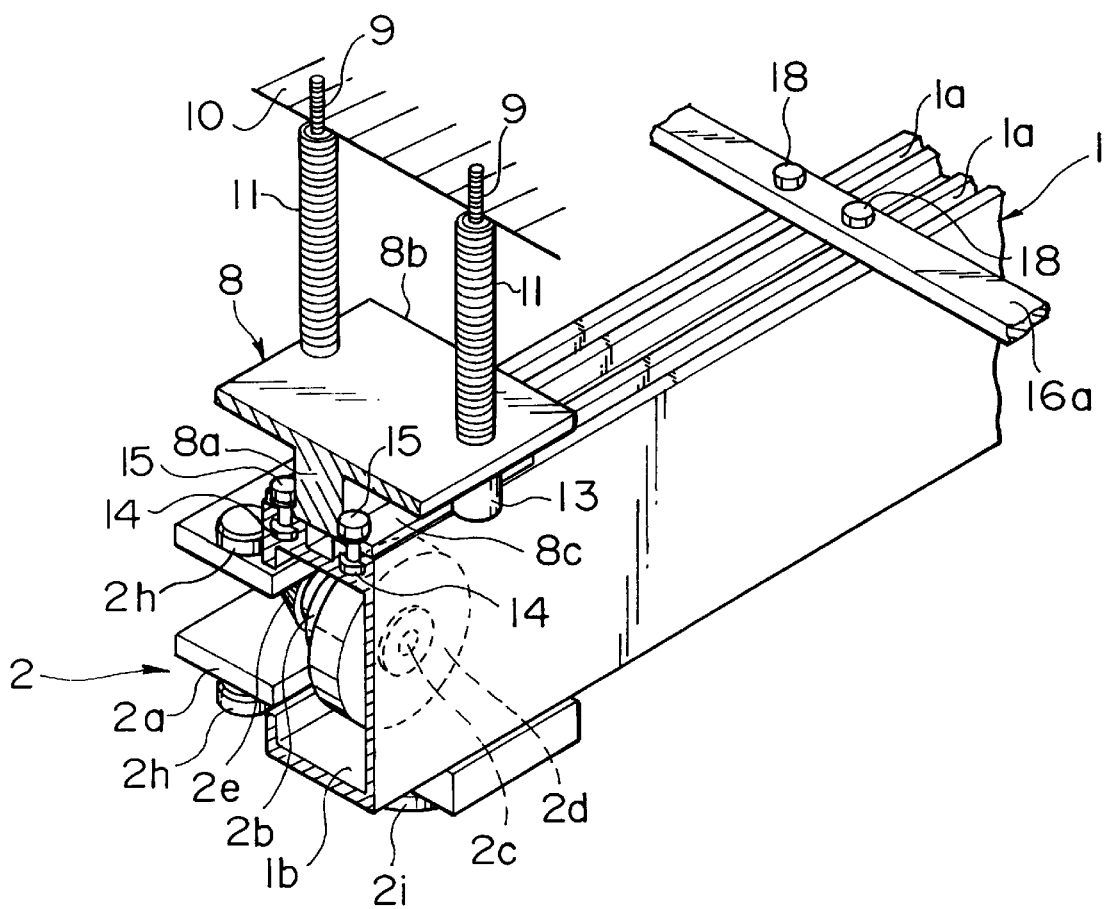
FIG. 4 is a summarised perspective view of the rail and overhead travelling carriage or the like for describing the the mounting means of the rail on the work transport system of the present invention.
Figure 5:
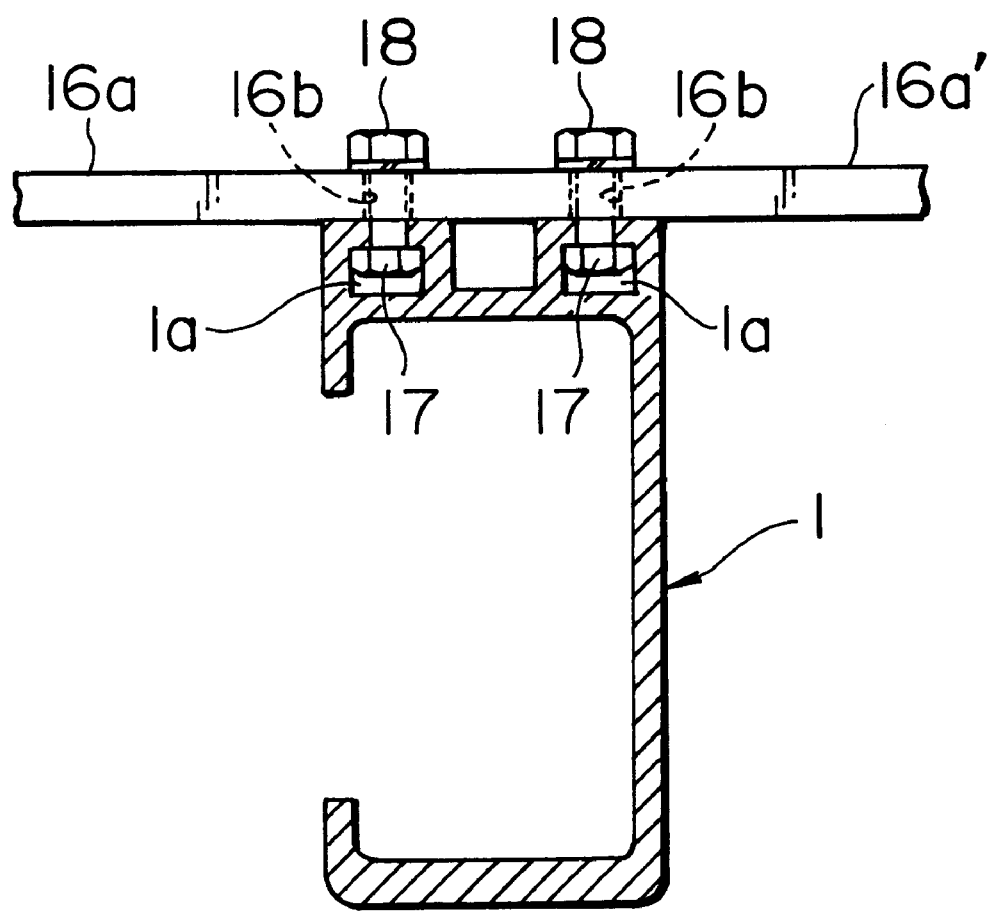
FIG. 5 is a summarised side view including a vertical section of the rail for describing the the mounting means of the platform assembly on the rail on the work transport system of the present invention.
Figure 6:
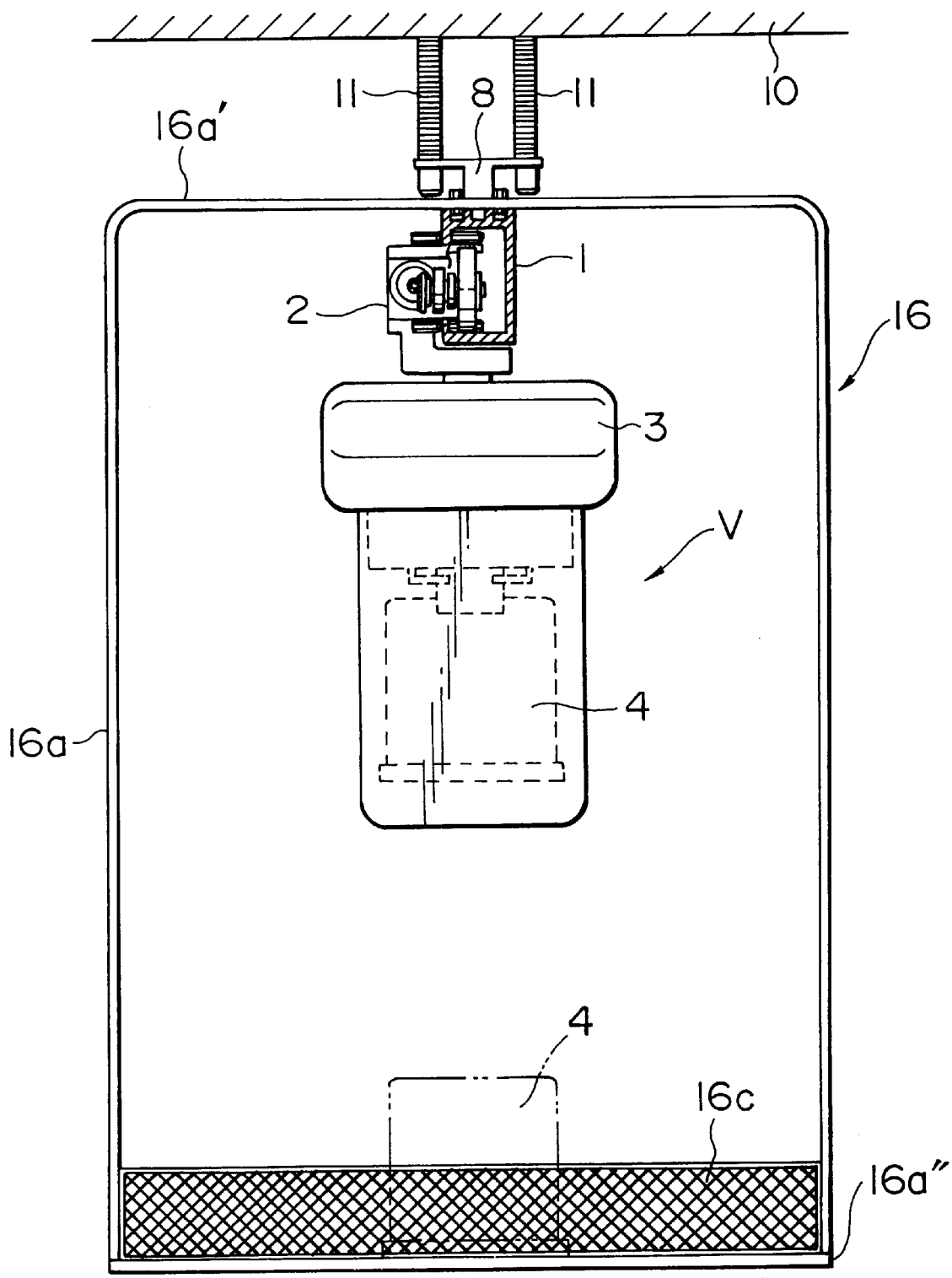
FIG. 6 is a side view of a storage rack member and overhead travelling carriage for describing the the mounting means of the storage rack member on the rail on the work transport system of the present invention.

Next, the mounting means of a rail 1 on the ceiling and the carriage 2 will be described using FIGS. 2 to 4.

8 is a rail support member and the rail support member 8 is formed from a vertical part 8*a*, an upper horizontal part 8*b* and a lower horizontal part 8*c*. 9 is a bolt arranged with a screw on the upper and lower part and the upper parts of a pair of bolts 9 arranged at a predetermined spacing are embedded in the ceiling 10 so that the rail 1 is enclosed. 11 is a cover that covers the bolt 9. The lower screw part of the bolt 9 is inserted in a hole arranged in the upper horizontal part 8*b* of the rail support member 8 and the rail support member 8 is mounted on the ceiling 10 via the bolt 9 by the upper horizontal part 8*b* of the rail support member 8 gripped by a pair of nuts 12*a*,12*b*. 13 is a cap that covers the screw part of the bolt 9 and nut 12*b* that project downwards from the upper horizontal part 8*b* of the rail support member 8.

A pair of grooves 1*a* are formed along the longitudinal direction of the rail 1 in the upper surface of the rail 1 and holes 8*d* are arranged at predetermined spacing in the lower horizontal part 8*c* of the rail support member 8. A nut 14 is inserted in the grooves la formed in the rail 1, a bolt 15 is inserted in the the hole 8*d* arranged in the lower horizontal part 8*c* of the rail support member 8 and the rail 1 is mounted on the rail support member 8 due to the screw of the bolt 15 being screwed into the nut 14 inserted in the groove 1*a* formed in the rail 1.

The rail support member 8 is mounted on the ceiling 10 at a predetermined spacing via the bolt 9 as described above and the rail 1 is arranged near the ceiling 10 due to the mounting of the rail 1 an the rail support member 8.

A horizontal shaft 2*c* is arranged in the main body 2*a* of the carriage 2 via a bearing 2*b* and a wheel 2*d* that rotates along a lower horizontal surface 1*b* of the rail 1 is mounted on one end of the horizontal shaft 2*c*. A bevel gear 2*e* is mounted on one end of the horizontal shaft 2*c* and a bevel gear 2*g* mounted on the output shaft of a motor 2*f* engages with the bevel gear 2*e*. Guide rollers 2*h* are arranged so as to be able to freely rotate on the main body 2*a* of the carriage 2 such that an upper vertical edge 1*c* and lower vertical edge 1*d* are each gripped. Accordingly, due to the rotation of the horizontal shaft 2*c* via the bevel gear 2*e* mounted on the horizontal shaft 2*c* and the bevel gear 2*g* mounted on the output shaft of a motor 2*f* and due to the driving of the motor 2*f*, the wheel 2*d* rotates and the carriage 2 is made to run along the rail 1. As the guide rollers 2*h* grip each of the upper vertical edge 1*c* and lower vertical edge 1*d* of the rail 1, the carriage 2 is able to run along the rail 1 in a stable state. Also, a pivot shaft 2*i* is mounted on the main body 2*a* of the carriage 2 and the travelling carriage main body 3 is linked to that pivot shaft 2*i*.

Next, using FIGS. 5 to 8, the means for mounting a platform assembly on the rail 1 will be described. In this embodiment, the platform is a storage rack member 16.

16*a* is a framework and a pair of holes 16*b* are arranged at a predetermined spacing in an upper horizontal part 16*a*' of the framework 16*a*. A nut 17 is inserted in the groove 1*a* formed in the rail 1, a bolt 18 is inserted in the the hole 16*b* arranged in the upper horizontal part 16*a*' of the framework 16*a* and the framework 16*a* is mounted on the upper surface of the rail 1 due to the screw of the bolt 18 being screwed into the nut 17 inserted in the groove 1*a* formed in the rail 1.

A plurality (in the present embodiment, two framework 16*a* are mounted as shown in FIG. 8) of framework 16*a* are mounted at predetermined spacings along the longitudinal direction of the rail 1 and the rack 16*c* is mounted on the lower horizontal part 16*a*" of the framework 16, all of the frameworks combining to define an opening having sufficient clearance to allow the entire hoist unit and chuck device to travel horizontally therethrough. Thus, the storage rack member 16 is comprised of a plurality of framework 16*a* mounted on the rail 1 and the rack 16*c* loaded on the lower horizontal part 16*a*" of the rack frame 16*a*. A rack 16*c* loaded on the lower horizontal part 16*a*" of the rack frame 16*a* is positioned below the overhead travelling carriage V so that the work 4 loaded on the rack 16*c* does not collide with the overhead travelling carriage V running along the rail 1. Furthermore, the upper horizonal part 16*a*' and lower horizonal part 16*a*" are of sufficient width so that the vertical part of the framework 16*a* does not collide with the overhead travelling carriage V.

In order to reduce the transfer time of the work 4 by the overhead travelling carriage V to the rack 16*c* and furthermore in order to increase the space below the rack 16*c*, it is preferable for the storage rack member 16 to be as close to the rail 1 as possible in the vertical direction within a range so that the work 4 loaded on the rack 16*c* does not collide with the overhead travelling carriage V.

Figure 9:
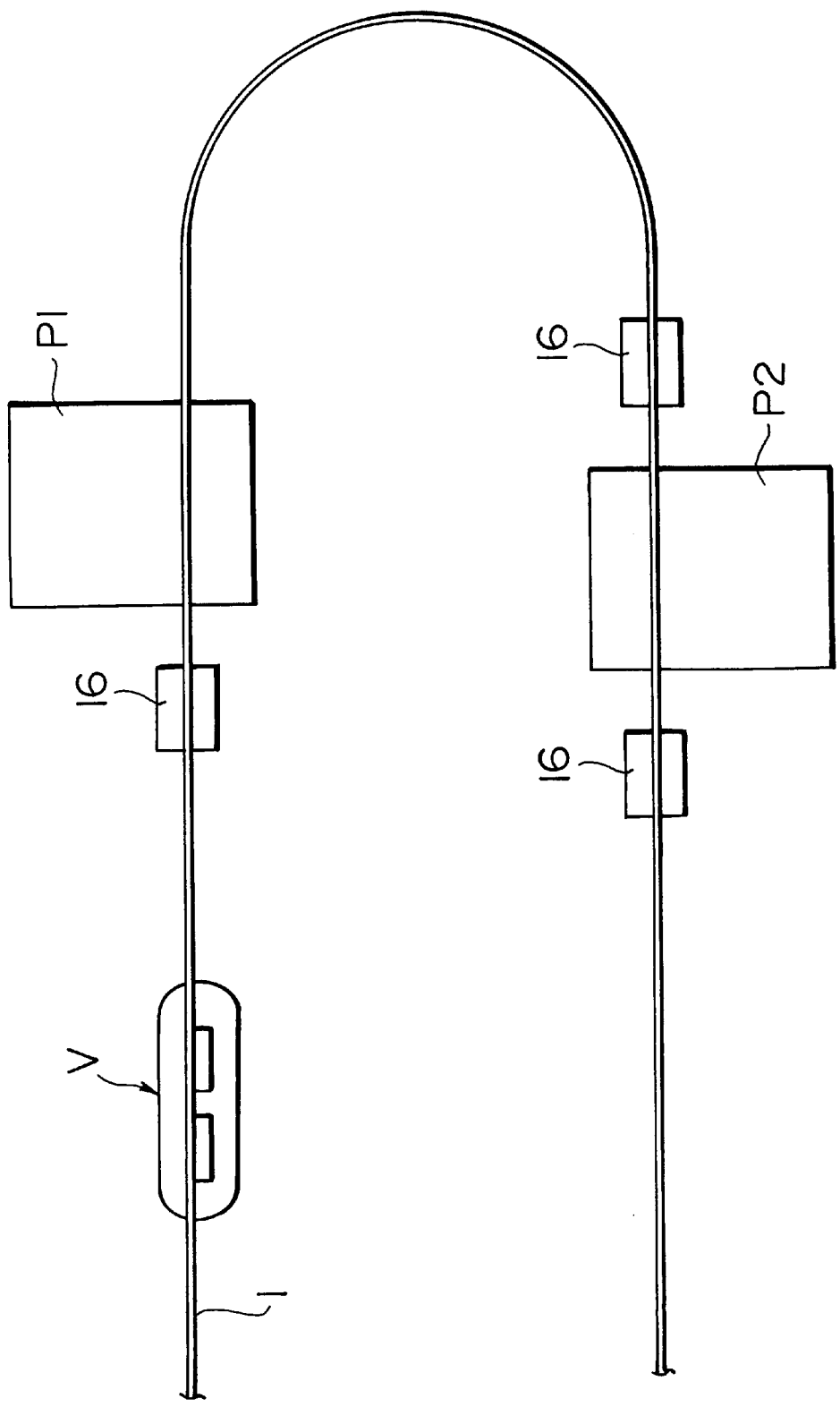
FIG. 9 is a partial plan view of the work transport system of the present invention.

Next, using FIG. 9, the functions of the storage rack member 16 arranged on the rail 1 as above will be described.

The rail 1 is arranged in the vicinity of the ceiling in this example as an approximate U-shape and the overhead travelling carriage V runs along the rail 1. P1,P2 are processing stations for performing the desired processing on the work 4 and the storage rack member 16 is suspended from the rail 1 in the vicinity of the processing station P1. At processing station P1, when a plurality of work 4 is to be processed together, the work 4 transported by the overhead travelling carriage V to the processing station P1 and loaded on the storage rack member 16 suspended from the rail 1 near the processing station P1 without being loaded on the floor or the like. After a predetermined amount of work 4 has been stored on the storage rack member 16, the work 4 is supplied to the processing station P1 by the overhead travelling carriage V.

Two storage rack members 16 are positioned in front of and behind the processing station P2. For example, a predetermined amount of work 4 processed by the processing station P2 as described above is loaded on the storage rack member 16 positioned to the right of processing station P2 and processed work 4 or empty boxes into which work 4 may be stored are loaded in the storage rack member 16 positioned to the left of processing station P2.

It should be noted that in the above described embodiment, an example has been described where the storage rack member 16 is suspended below the rail 1 but the upper part of the bolt may be embedded in the ceiling, a plurality of rack frames 16a may be mounted on the ceiling 10 and the racks 16c may be mounted on the rack frame 16a via the bolt by mounting the rack frame 16a on the lower part of the bolt. Further, it is also possible to arrange the storage rack member 16 along the entire length of the rail 1 except the positions directly above the processing stations P1,P2 and not only in the vicinity of the processing stations P1,P2.

Figure 10:
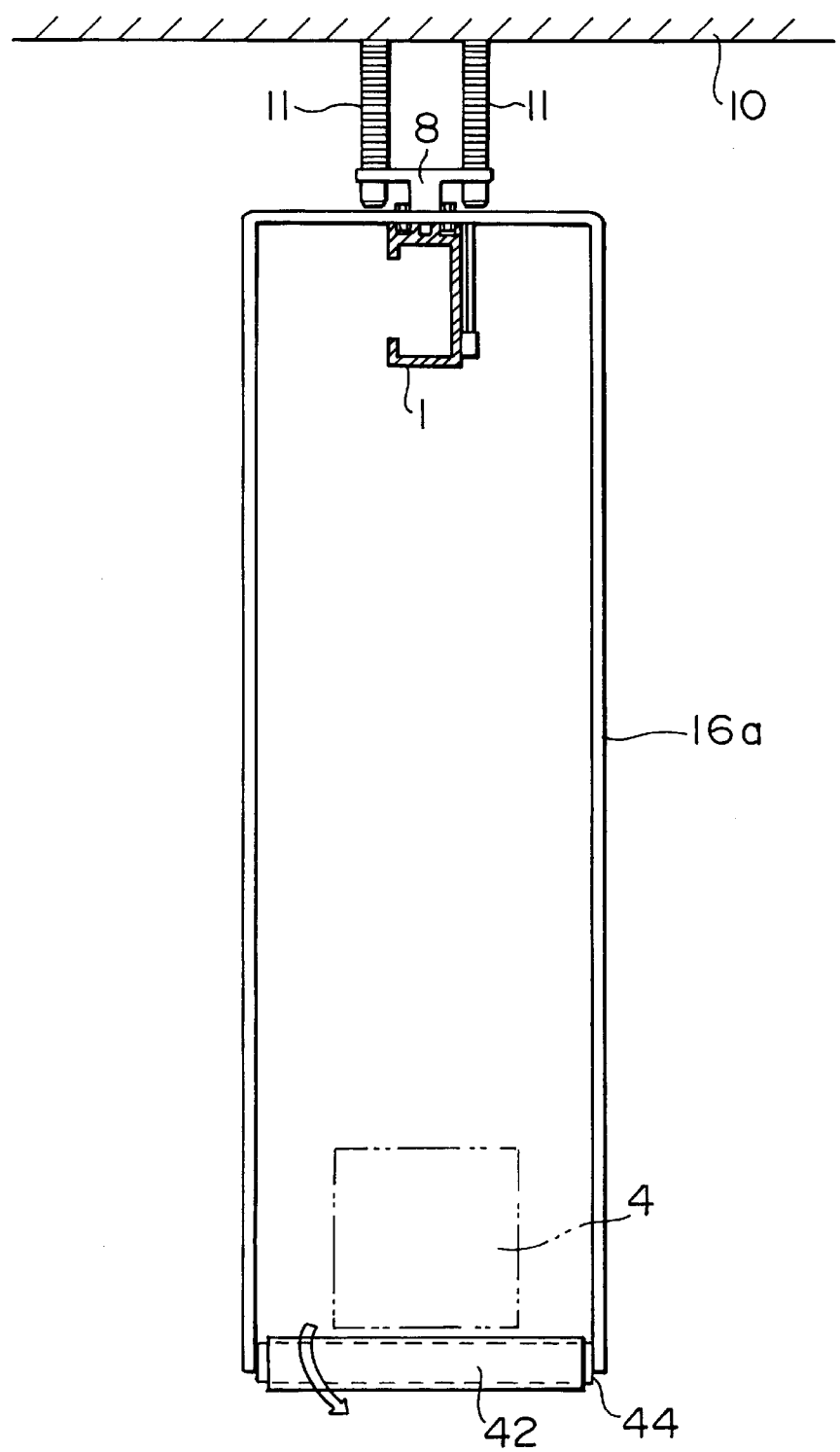
FIG. 10 is a summarised side view showing another embodiment of the work transport system of the present invention.

Net, another embodiment of the present invention will be described. FIG. 10 shows the arrangement of the platform assembly a belt conveyor 42 inside a clean room. As previously described, the belt conveyor 42 is suspended by framework 16a, from the rail support member 8 above the rail 1. 44 is a conveyor shaft and the belt conveyor 42 is able to store, for example, up to 5 pieces of work 4.

Figure 11:
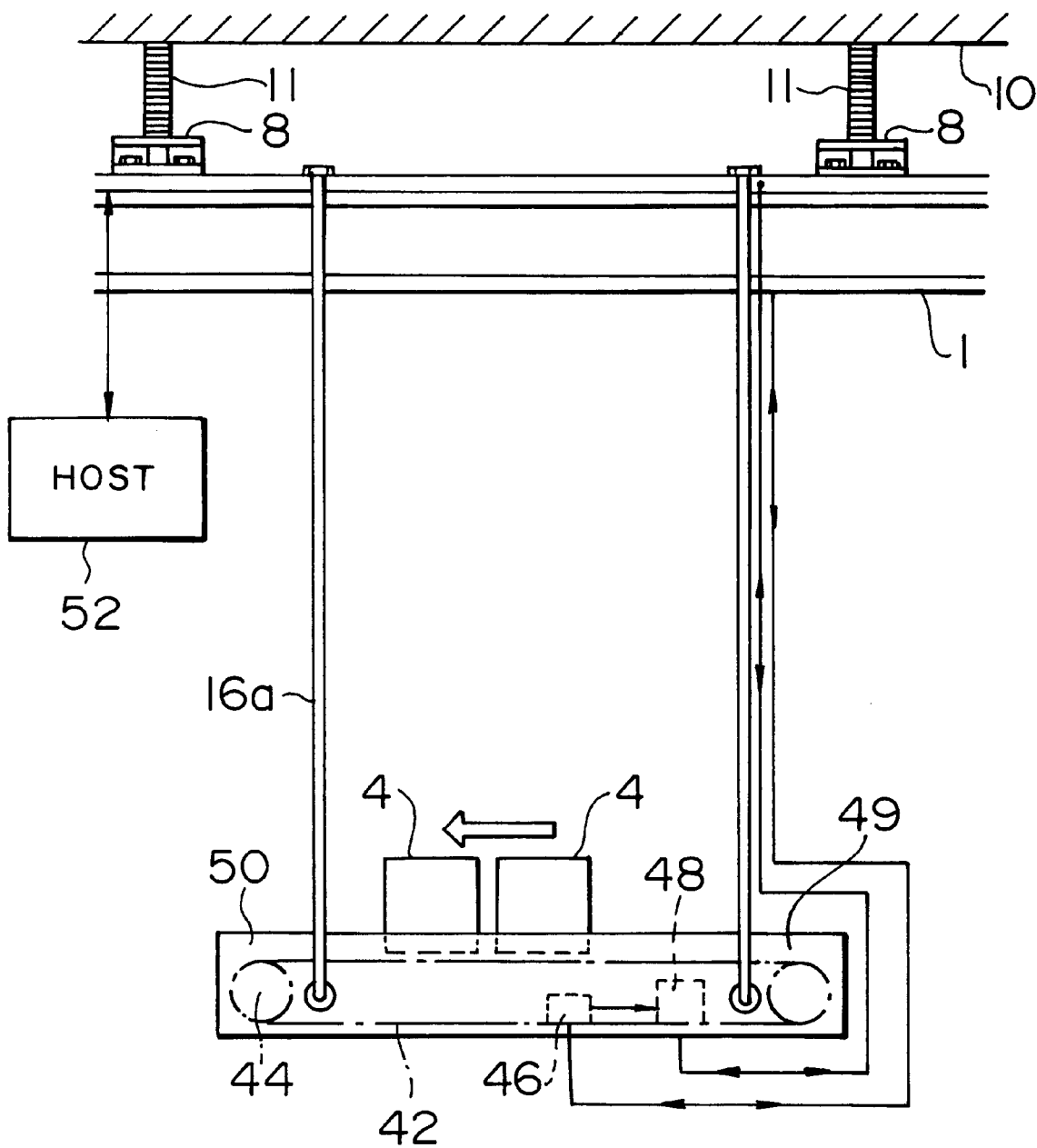
FIG. 11 is a front view of the periphery of the platform assembly conveyor on the work transport system of FIG. 10.
Figure 12:
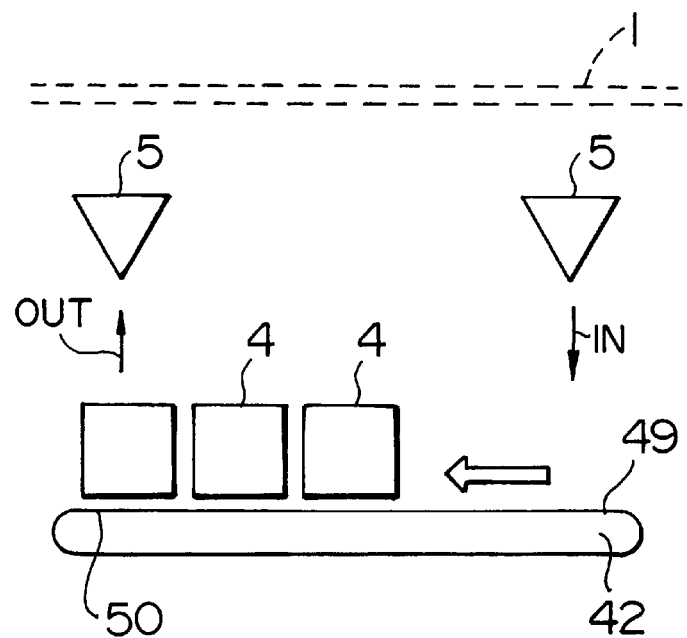
FIG. 12 is a view showing the operation of the conveyor on the work transport system of FIG. 10.

In the arrangement of the belt conveyor 42 as shown in FIG. 11, 46 is a controller which is connected to a host computer 52 via a communication cable. 48 is a motor connected to a contact wire. The controller 46 is operated by a command from the host computer 52 and the belt conveyor 42 is moved in the direction of the arrow shown in the drawing via the motor 48 by that signal. The right edge of the drawing of the belt conveyor 42 is a loading station 49 and the left edge is a delivery station 50. 52 is the aforementioned host computer and controls the overhead travelling carriage V and belt conveyor 42 by communication. As shown in the operations of the belt conveyor 42 in FIG. 12, the overhead travelling carriage V grips the work 4 and lowers it to the loading station 49 and unloads the work 4 on the belt conveyor 42 by implanting it on the belt conveyor 42. The unloaded work 4 is transported towards the delivery station 50 by the belt conveyor 42 and transported from the delivery station 50 by the chuck device 5.

Figure 13:
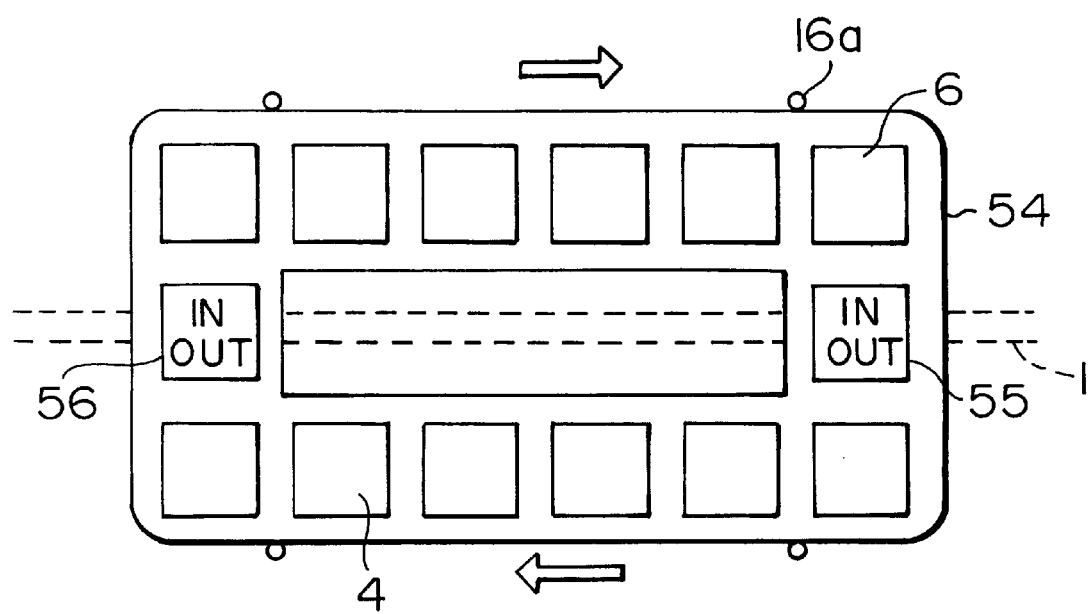
FIG. 13 is a plan view showing a different embodiment of the conveyor on the work transport system of FIG. 10.

FIG. 13 shows an example of a circulation type conveyor 54. On this conveyor 54, the loading and delivery stations are arranged at positions 55,56 directly below the rail 1 and the work 4 unloaded at the station 55 is sent to the station 56 by the conveyor 54 and the work 4 unloaded at the station 56 is sent to the station 55. It should be noted that conveyors 42,54 are belt conveyors but may be chain conveyors, slat conveyors or roller conveyors or the like.

Figure 14:
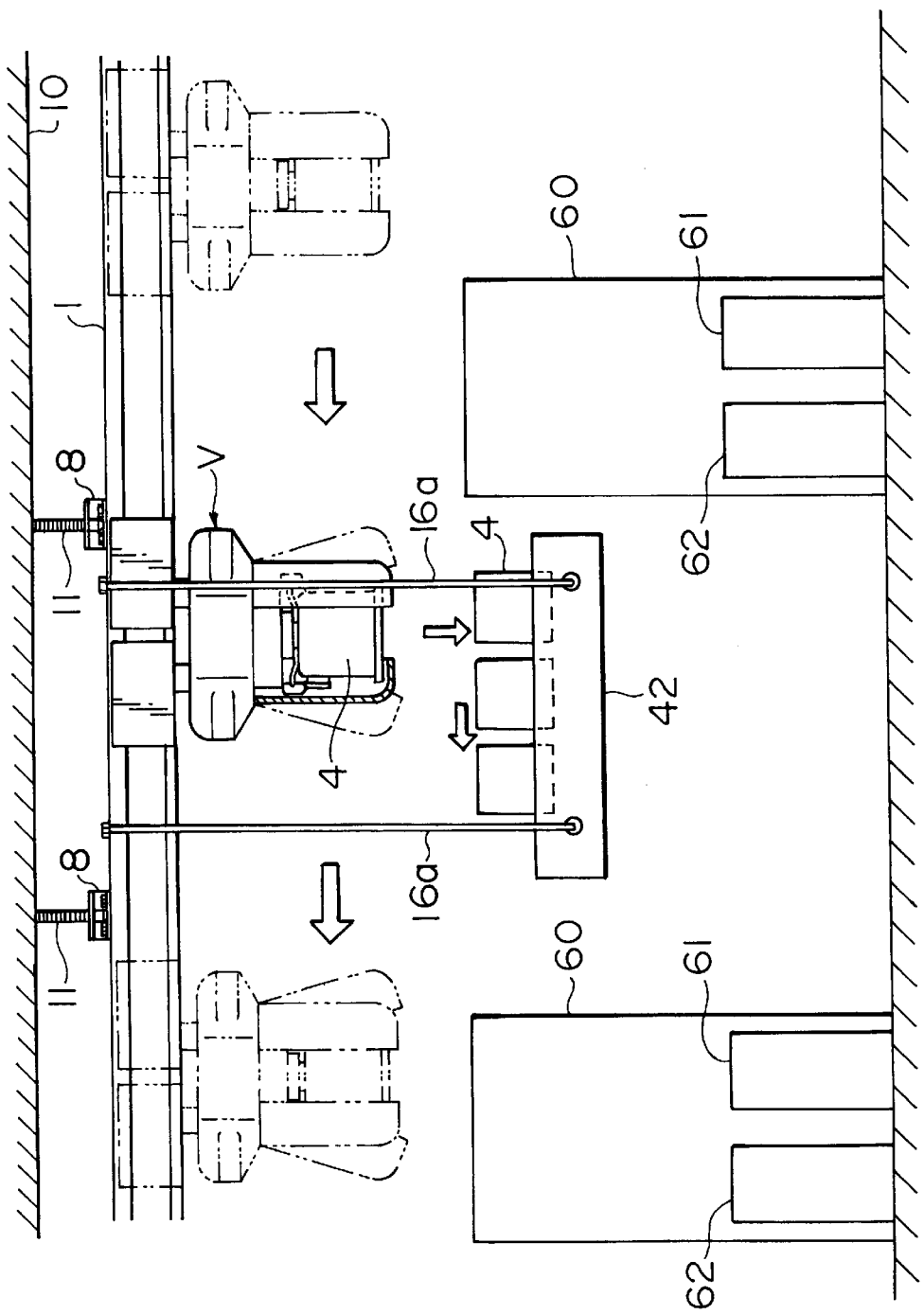
FIG. 14 is a front view showing the arrangement of the processing device and conveyor of the work transport system of FIG. 10.
Figure 15:
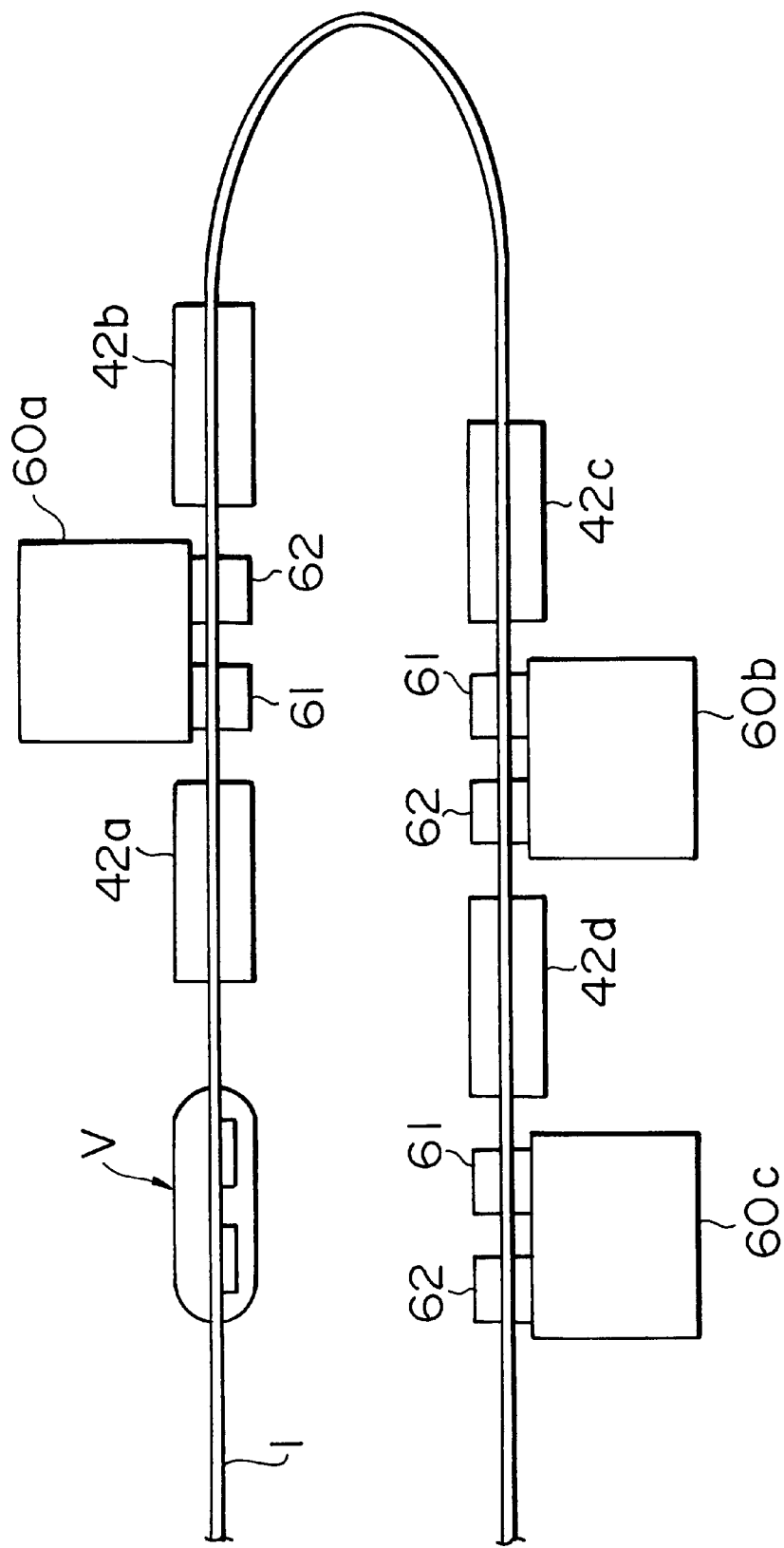
FIG. 15 is a plan view showing the arrangement of the work transport system of FIG. 10.

In FIGS. 14 and 15 showing the layout of the work transport system, 60 is a work processing device such as a film production device, impurity injection device or cleaning device. 61,62 are those stations with, for example, the work 4 being received from the overhead travelling carriage V at the station 61 and processing being performed where after being transported to the processing device 60 and removing the case, the board or the like inside is taken out. Then, it is stored once again in the case inside the processing device 60 and transported from the station 62. In this way, the stations 61,62 also double as buffers between the processes. The belt conveyor 42 is positioned along the rail 1 between the processing devices 60,60 as shown in the drawing for example, the belt conveyor 42 is used as a buffer between the left and right processing devices and after processing at the right processing device has finished, is used as a buffer before being moved to the left side processing device. If so arranged, the storage capacity of the stations 61,62 of the processing devices 60 may be reduced and the space of the clean room may be more effectively utilised.

The conveyor 42 is positioned corresponding to the processing devices 60 as shown in FIG. 15 for example. The conveyor 42a of FIG. 9 is used as a buffer for before the processing device 60a and the conveyor 42b is used as an exit side buffer of the processing device 60a. Similarly, a conveyor 42c is used as a buffer for before the processing device 60b and a conveyor 42d is used as a buffer for between the processing devices 60b,60c. These kinds of conveyors 42 are arranged as two types; as a ratio of 1:1 with the processing device (conveyors 42a,42b,42c) and a ratio of 1:2 with the processing device 60 (conveyor 42d).

Figure 16:
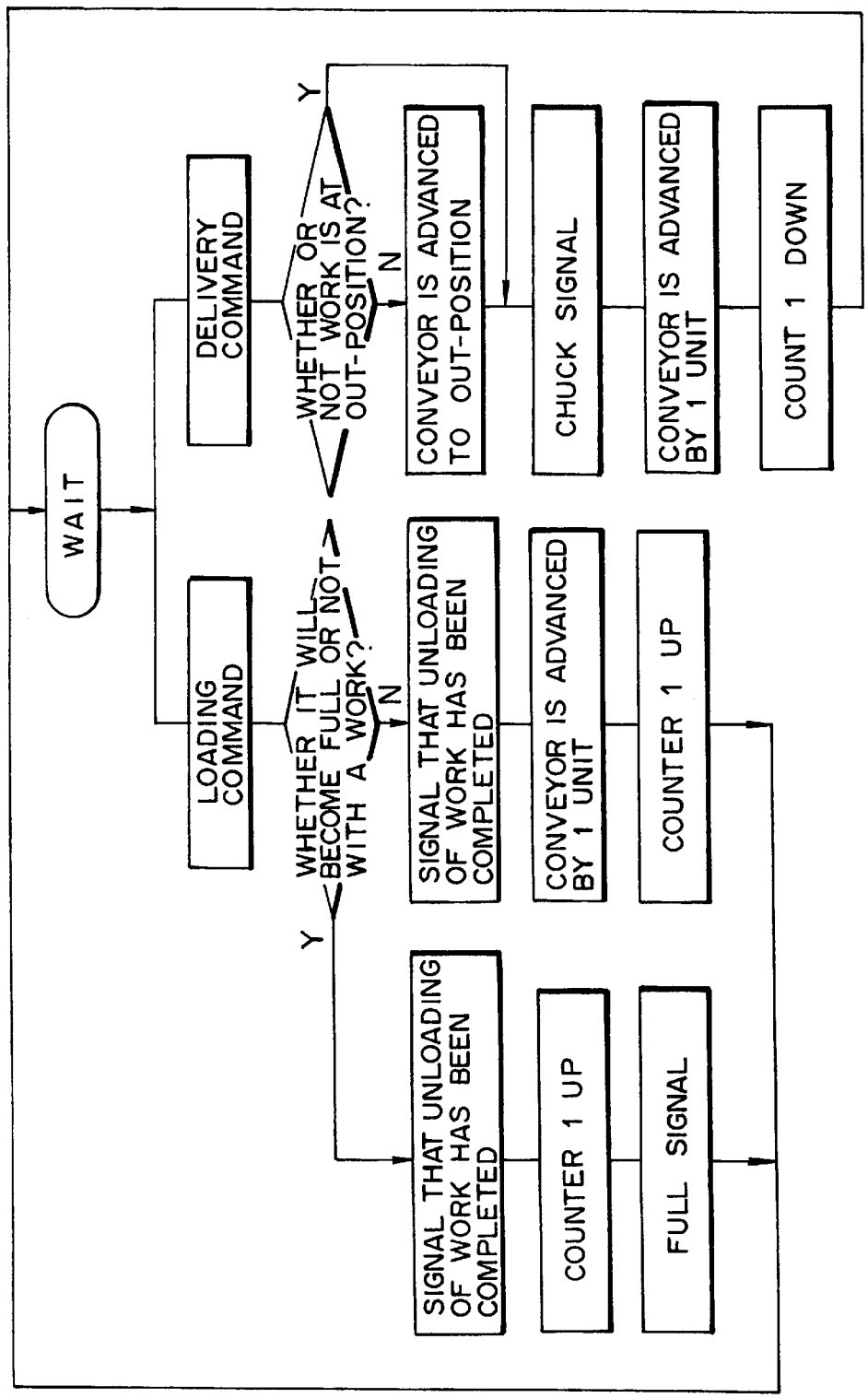
FIG. 16 is an operation flow chart of the work transport system of FIG. 10.

As shown by the operations of conveyor 42 in FIG. 16, when storage of the work 4 is commanded by the host computer 52, the controller 46 checks the amount of stored work 6 on the conveyor 42 and checks whether it will become full or not with the addition of a single unit. In either case, the work 4 is unloaded by the chuck device 5 to the loading station 49 which has been prevacated, a signal that confirms that the unloading of the work 4 has been completed is awaited and the counter of the existing amount in the controller 46 is increased by 1. When the conveyor 42 becomes full due to the implantation of work 4, a full signal is reported to the host computer 52. In all other cases, the conveyor 42 is advanced by 1 unit of work 4 and the work 4 is moved 1 step at a time towards the delivery station 50.

When a delivery command from the host computer 52 arrives, a check is carried out of whether the work 4 exists in the delivery station 50 or not and when it does not exist, the leading work 4 is advanced as far as the delivery station 50. Next, a signal showing that the chucking of the work 4 by the chuck device 5 has finished is awaited via the the host computer 52. Thereafter, the conveyor 42 is advanced by one unit's worth of work and 1 is subtracted from the counter of the controller 46 showing the number of existing work.

The present embodiment is able to effectively utilise the available space of a clean room and in particular, is able to effectively utilise the available space below the rail 1. Furthermore, as the belt conveyor 42 may be used as a buffer between the processing devices 60,60, the time lag of the processes between processing devices 60,60 may be absorbed even if the scale of the stations 61,62 of the processing devices is small. The belt conveyor 42 is suspended by the framework 16a on the rail 1 and the attachment and positioning of the belt conveyor 42 is simple. Also, as the belt conveyor 42 may stop the overhead travelling carriage V at the two points of the loading station 49 and delivery station 50, the stoppage points are reduced. Due to this, the number of stoppage marks arranged on the rail 1 may be reduced and the stoppage control is simplified. Furthermore, as the conveyor 42 transports first the previously received work 4, the older the work, the more quickly it is sent to the next process. Furthermore, the controller 64 counts the existing amount of the work 4 at the conveyor 42, always makes the loading station 49 vacant and thus if control so that each work 4 is continuously lined up, there is no need for control of each position of the work 4 on the conveyor 42. Accordingly, the control of the conveyor 42 is also simplified.

As a result of the construction as described above, the present invention demonstrates the following advantages.

As the storage rack member on which work may be loaded is positioned below the rail and above the floor, a reduction in space of the processing station and floor may be realised and the transfer time of the work by the overhead travelling carriage may be shortened.

As the storage rack member is mounted on the rail, the mounting operation of the storage rack member is simplified without the arrangement of a special mounting member on the ceiling.

As the framework is mounted on the rail by the screwing of a bolt into a nut which is inserted in a groove formed in the rail, the framework may be easily mounted and removed and the mounting position of the storage rack member may be easily changed along the rail.

As a work storage conveyor is suspended by a rail or the like between the rail and floor, the vacant space under the rail may be used for the storage of work. Also, as a predetermined position of the conveyor directly below the rail is assigned as a work transfer station, the received work may be moved to a position other than the transfer station of the conveyor. As a result, as the overhead travelling carriage need only be stopped directly above the transfer station, the stoppage positions of the overhead travelling carriage may be reduced and the stoppage control is simplified.

A pair of transfer stations are arranged on the conveyor and the work received at one station is moved towards the other station by the conveyor. If this is arranged, the work first received is first transported and work is transported in the production order of the plant or storage order of the warehouse.

If the overhead travelling carriage system is arranged in a clean room, the valuable space inside the clean room may be effectively utilised. Furthermore, by arranging the conveyor corresponding to the work processing devices, the operation timing between processing devices may be absorbed by the conveyor. Yet further, if the conveyor is suspended by a rail, the arrangement of the conveyor is simplified.

I claim:

1. A building located work transport system, including:
   a substantially horizontal rail system suspended from a ceiling of the building;
   a traveling carriage connected to the rail system and movable along the rail system;
   a hoist unit connected to the traveling carriage;
   a chuck device connected to the hoist unit and vertically movable thereby; and
   a non-movable platform assembly suspended from one of the ceiling and a rail of the rail system, the platform assembly being located in a path of the traveling carriage, for temporarily depositing the work between the ceiling and a floor of the building;
   the platform assembly including a framework defining an opening having sufficient clearance to allow the entire hoist unit and chuck device to travel horizontally therethrough.

2. A building located work transport system according to claim 1, wherein the suspended platform assembly is a storage rack member for storing work between the ceiling and floor of the building.

3. A building located work transport system according to claim 1, wherein the hoist unit includes a winding drum, and rotation of the winding drum feeds out or feeds in wire connected between the winding drum and the chuck device.

4. A building located work transport system according to claim 1, wherein the platform assembly suspends from the rail and is connected to the rail by a nut and bolt assembly, the nut and bolt assembly extending through a hole in the framework and into a longitudinal groove located in the rail.

5. A building located work transport system according to claim 1, wherein the platform assembly includes a belt conveyor.

6. A building located work transport system according to claim 5, wherein the platform assembly suspends from the rail.

7. A building located work transport system according to claim 1, wherein the platform assembly includes a circulation belt conveyor system.

* * * * *